United States Patent
Ezumi et al.

(10) Patent No.: US 6,422,449 B1
(45) Date of Patent: Jul. 23, 2002

(54) METHOD OF MENDING A FRICTION STIR WELDING PORTION

(75) Inventors: Masakuni Ezumi; Kazusige Fukuyori, both of Kudamatsu; Akihiro Satou, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/714,610

(22) Filed: Nov. 17, 2000

Related U.S. Application Data

(63) Continuation of application No. 09/504,080, filed on Feb. 15, 2000, now abandoned.

(30) Foreign Application Priority Data

May 26, 1999 (JP) .............................. 11-145759

(51) Int. Cl.⁷ .......................... B23K 31/02; B23K 20/12
(52) U.S. Cl. .................... 228/114.5; 228/119; 228/199; 29/402.06
(58) Field of Search ........................... 228/119, 2.1, 2.3, 228/112.1, 199, 114.5; 219/121.36, 121.38, 121.45, 121.46; 156/73.5; 29/402.04, 402.06, 402.09, 402.11, 402.18

(56) References Cited

U.S. PATENT DOCUMENTS

| | | | |
|---|---|---|---|
| 4,666,743 A | * | 5/1987 | Ohta et al. |
| 5,267,279 A | * | 11/1993 | Saito et al. |
| 5,283,415 A | * | 2/1994 | Nishi et al. |
| 5,322,539 A | * | 6/1994 | Mathisen et al. |
| 5,359,815 A | * | 11/1994 | Schrunk, III et al. |
| 5,453,243 A | * | 9/1995 | Hansen et al. |
| 5,532,450 A | * | 7/1996 | Iwai et al. |
| 5,565,749 A | * | 10/1996 | Jinno et al. |
| 5,615,794 A | * | 4/1997 | Murray, Jr. |
| 5,620,652 A | * | 4/1997 | Tack et al. |
| 6,050,474 A | * | 4/2000 | Aota et al. |

FOREIGN PATENT DOCUMENTS

EP 0797043 9/1997

\* cited by examiner

*Primary Examiner*—Tom Dunn
*Assistant Examiner*—Colleen P. Cooke
(74) *Attorney, Agent, or Firm*—Antonelli, Terry, Stout & Kraus, LLP

(57) ABSTRACT

A welding bead 50 is formed along to a jointing potion 40 using friction stir welding on a first frame member 20 and a second frame member 30, each of which is a hollow extruded molded base member made of an aluminum alloy A6N01 material. When a defect exists in this welding bead 50, the welding bead including this defect is moved by a grinding processing and then a mending zone is formed. In this mending zone, a mending bead is formed using TIG welding. The welding rod used in this TIG welding is made of the same material as the base member of the frame member, and so the composition of the welding bead is formed homogeneously. In the friction stir welding portion, a hairline processing is performed, so that a surface having a beautiful appearance, in which a boundary between the frame members and traces of the defect are inconspicuous, can be obtained. In a case of manufacture of a structural body, such as a railway car, in which an aluminum alloy material is subjected to a friction stir welding, an improvement of the method of mending the friction stir welding portion can be achieved.

29 Claims, 5 Drawing Sheets

_US 6,422,449 B1_

METHOD OF MENDING A FRICTION STIR WELDING PORTION

This application is a continuation of application Ser. No. 09/504,080, filed Feb. 15, 2000, now abandoned.

BACKGROUND OF THE INVENTION

The present invention relates to a mending method of a friction stir joining portion and in particularly to relates to a mending method of a friction stir joining portion of members which employ an aluminum alloy material as a base member.

A friction stir joining method is a method in which by rotating a round rod (it is called as a rotary tool) which is inserted into a joining portion of two members to be subjected to a friction stir joining, such as aluminum alloy extruded frame members, and moving the rotary tool along to a joining line of the two extruded frame members to be subjected to the friction stir joining. The friction stir joining portion of the two extruded frame members to be subjected to the friction stir joining is heated, softened and plastically fluidized.

The rotary tool is comprised of a small diameter portion which is inserted into the friction stir joining portion of the two extruded frame members and a large diameter portion which is positioned at an outside portion of the small diameter portion. A center of the small diameter portion of the rotary tool and a center of the large diameter portion of the rotary tool are positioned to the same axis.

A boundary portion between the small diameter portion and the large diameter portion of the rotary tool is inserted a little into the friction stir joining portion of the two extruded frame members. The rotary tool is inclined toward a rearward against an advancing direction of a joining of the two extruded frame members.

When the friction stir joining is carried out to the two extruded frame members, at a surface of a side of the extruded frame member to which the rotary tool is inserted, a raised portion of the extruded frame member is formed. For this reason, at the friction stir joining portion of the two extruded frame members a plate thickness of the extruded frame member becomes to be reduced.

To prevent the above stated plate thickness of the extruded frame member, at an end portion of an extruded frame member to be subjected to the friction stir joining the raised portion which projects toward a side of the rotary tool is provided, and including this raised portion the friction stir joining is carried out to the two extruded frame members.

Further, in place of the provision of the raised portion to the extruded frame member, a third plate is arranged to the two extruded frame members (a first extruded frame member and a second extruded frame member) and the friction stir joining is carried out to the two extruded frame members and the third plate.

Further, in a friction stir joining of hollow frame members, a supporting plate which is arranged orthogonal to a face plate of the hollow frame member is provided integrally and then by a force of the friction stir joining a bending of the face plate of the hollow frame member can be prevented.

The above stated technique is disclosed in Japanese application patent laid-open publication No. Hei 9-309164 (EP 0797043 A2).

FIG. 9 shows a technique for joining a side structure of a railway car 10 according to the friction stir joining. In a structure member of the side structure of the railway car 10, extruded frame members 20 and 30 (a first extruded frame member 20 and a second extruded frame member 30) are employed.

Such extruded frame members 20 and 30 are manufactured by extruding and molding, for example, aluminum alloy members (A6N01 material) are joined at a respective side edge portions and along to a joining line 40 of the first extruded frame member 20 and the second extruded frame member 30 the friction stir joining is performed on the first extruded frame member 20 and the second extruded frame member 30 and a joining bead 50 is formed between the first extruded frame extruded member 20 and the second extruded frame member 30.

As an extruded frame material of an aluminum and/or an aluminum alloy, the above stated A6N01 material is used as a railway car material, since a complicated cross-section shape large thin hollow frame member can be obtained and high anti-corrosion performance and a good welding performance can be attained.

A chemical composition of the above stated A6N01 material is 0.40–0.9% Si, less than 0.35% Fe, less than 0.35% Cu, less than 0.50% Mn, 0.40–0.8% Mg, less than 0.3% Cr, less than 0.25% Zn, less than 0.10% Ti, and Al (residual).

Next, the joining bead 50 of the first extruded frame member 20 and the second extruded frame member 30 is inspected, when there is no defect it can leave as it is and when the defect is discovered in the joining bead 50 after the mending of the defect on the joining bead 50 a hairline processing etc. is performed and accordingly a surface of the first extruded frame member 20 and the second extruded frame member 30 having a beautiful appearance feeling can be formed.

FIG. 4 shows a state in which the friction stir joining is performed along to the joining line 40 of the first extruded frame member 20 and the second extruded frame member 30 and the joining bead 50 is formed between the first extruded frame member 20 and the second extruded frame member 30.

This joining bead 50 of the first extruded frame member 20 and the second extruded frame member 30 is inspected, for example, according to a ultra supersonic defect overseeing inspection and it is assumed that a defect 60 shown in FIG. 5 has discovered on the joining bead 50.

Further, form FIG. 1 to FIG. 7 (except for FIG. 3), a line of the end portion of the raised portion is excepted. Each of a structure shown in FIG. 6 and FIG. 7 shows a conventional mending process of the defect 70 which is discovered on the joining bead 50.

Each of the first extruded frame member 20 and the second extruded frame member 30 is manufactured respectively using A6N01 material being the aluminum alloy material as a base member according to the extruding processing. The joining bead 50, which is formed by performing the friction stir joining to the first extruded frame member 20 and the second extruded frame member 30, has also a component comprised of A6N01 material same to the base member of the first extruded frame member 20 and the second extruded frame member 30.

To remove the defect of this joining bead 50, a part including this defect portion is performed with a processing using a tool such as a grinder and a mending zone 70 is formed.

Next, MIG welding (metal inert gas welding) is performed and then a mending bead 80 is formed. As MIG welding, a welding wire suited to MIG welding is used. As a material of this welding wire, a material having A5356 regulation is used.

FIG. 8 shows a state in which to the joining portion including the joining bead 50 having been mended a hairline processing 52 is performed. The hairline processing 52 has a surface having a high homogenous property against to the surfaces of the first extruded frame member 20 and the second extruded frame member 30 and leaving the surface with no painting working state such a surface can used as the side structure of the railway car 10.

When the hairline processing 52 is performed to the joining bead 50 in which the joining bead 50 according to the above stated conventional friction stir joining is mended using MIG welding, the surface of a mended portion 82 shown in FIG. 8 exhibits a different appearance against the surface of the periphery of the mended portion 82.

As to an outer appearance of the mending portion, leaving as no painting as the side structure of the railway car 10 when the joining members are used, it becomes a problem from an aspect of the outer appearance feeling.

SUMMARY OF THE INVENTION

An object of the present invention is to provide a mending method of a friction stir joining portion in which the above stated problems can be solved.

Another object of the present invention is to provide a mending method of a friction stir joining portion in which a defect of the friction stir joining portion can be removed.

A further object of the present invention is to provide a mending method of a friction stir joining portion in which a defect of a joining bead of the friction stir joining portion of two members to be subjected to a friction stir joining can be removed.

A mending method of a friction stir joining portion according to the present invention which is formed by using a friction stir joining comprises a step of forming a mending zone by removing a defect which is included in a joining bead according to a grinding processing, and a step of forming a mending bead in the formed mending zone according to TIG welding (tungsten inert gas welding) using a welding rod which is the same material to the base member.

Further, a mending method of a friction stir joining portion according to the present invention further includes a step of performing a hairline processing to a joining portion which includes the mending bead and the joining bead.

DESCRIPTION OF THE INVENTION

Figure 1:
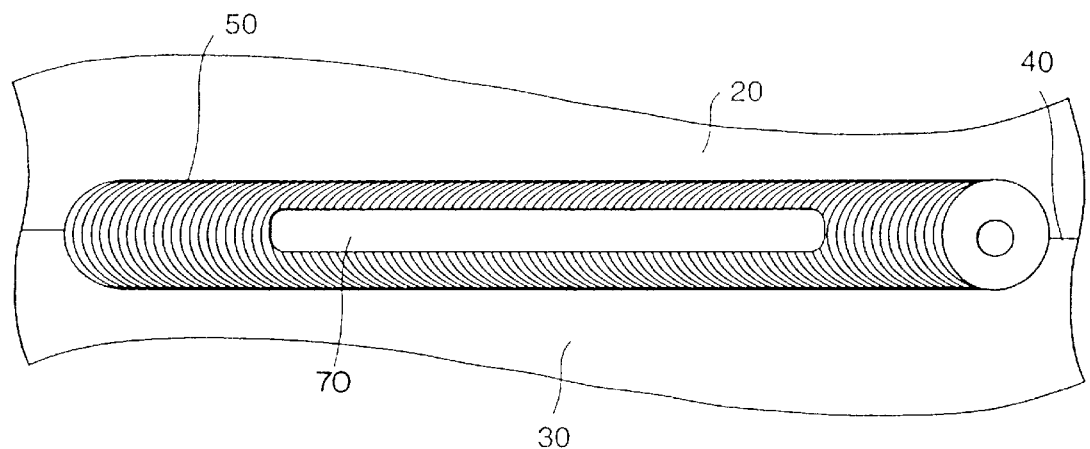
FIG. 1 is an explanatory view showing a mending process of a friction stir joining portion of one embodiment according to the present invention.
Figure 2:
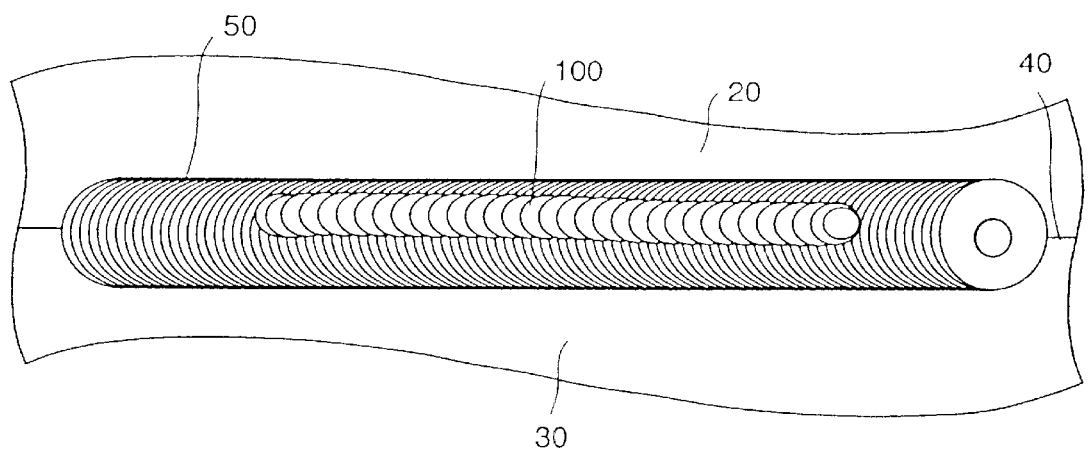
FIG. 2 is an explanatory view showing a mending process of a friction stir joining portion of one embodiment according to the present invention.

Each of FIG. 1 and FIG. 2 show a mending method of a friction stir joining portion of one embodiment according to the present invention will be explained.

A friction stir joining is performed to a joining portion 40 of a first extruded frame member 20 and a second extruded frame member 30 which constitutes a side structure of a railway car 10, and a joining bead 50 is formed on the joining portion 40 between the first extruded frame member 20 and the second extruded frame member 30.

Figure 9:
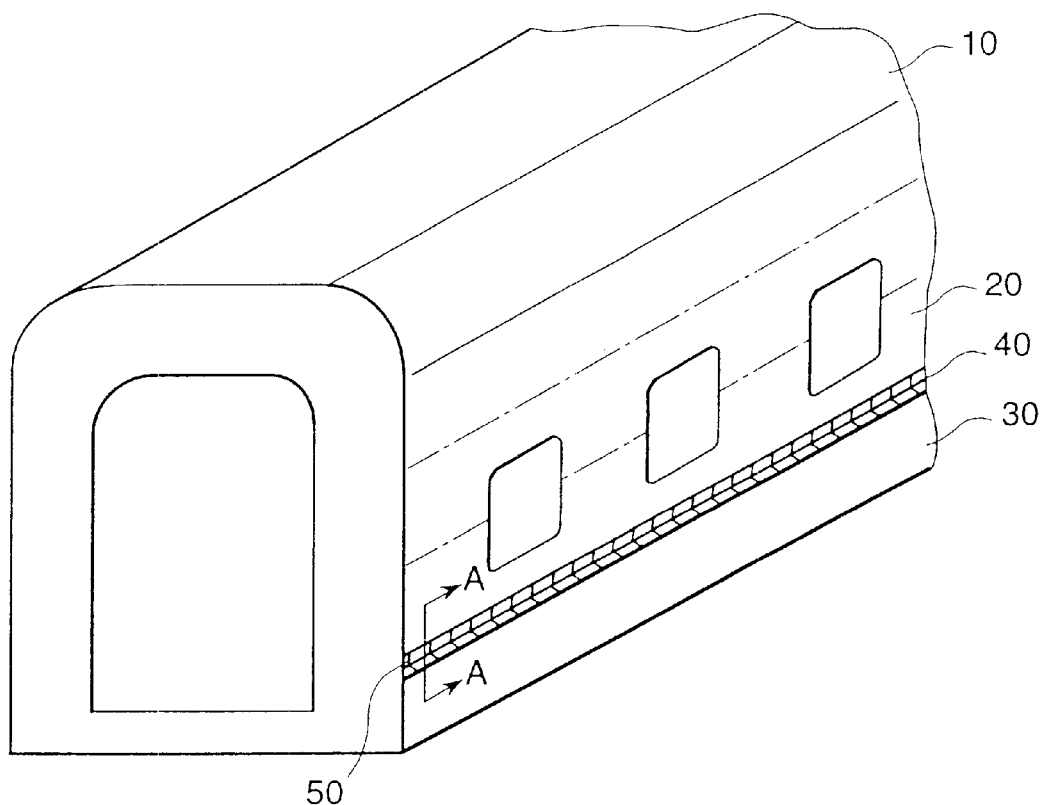
FIG. 9 is an explanatory view showing a manufacture of a side structure of a railway car according to a friction stir joining.
Figure 10:
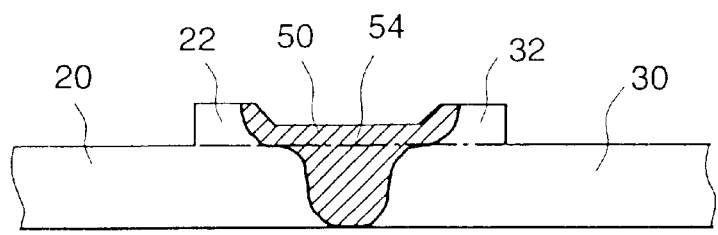
FIG. 10 is a cross-sectional view taken along to A—A line of FIG. 9.

FIG. 9 is an explanatory view showing a manufacture of a side structure of a railway car 10 according to a friction stir joining, and FIG. 10 is a cross-sectional view taken along to A—A line of FIG. 9.

In FIG. 10, a side end portion of a raised portion 22 of the first extruded frame member 20 and a side end portion of a raised portion 32 of the second extruded frame member 30 are abutted, and then the joining bead 50 is formed by performing the friction stir joining.

When each of a side of the raised portion 22 of the first extruded frame member 20 and a side of the raised portion 32 of the second extruded frame member 30 is used as an outer face of the railway car 10, a joined raised portion is used as a flat face 54 according to the grinding processing etc. However, when an opposite face of the joined raised portion is formed as an outer side of the railway car 10, the joined raised portion may leave as it is.

The above stated joining bead 50 of the first extruded frame member 20 and the second extruded frame member 30 is formed with the similar material of A6N01 material which is the base member of the first extruded frame member 20 and the second extruded frame member 30.

Next, the joining bead 50 of the first extruded frame member 20 and the second extruded frame member 30 is inspected. This inspection of the joining bead 50 can be carried out under a condition where the raised portion 22 of the first extruded frame member 20 and the raised portion 32 of the second extruded frame member 30 are left or under a condition of after the cutting of the raised portion 22 of the first extruded frame member 20 and the raised portion 32 of the second extruded frame member 30.

A result of the inspection of the joining bead 50, when a defect such as a broken portion and a pit etc. on the joining bead 50 is discovered, a periphery of the joining bead 50 including such a defect is removed or is carried out by the grinding using a grinder, and then a mending zone 70 is formed.

Next, as shown in FIG. 2, to a mending bead 100 is formed according to. Namely, a butt welding is carried out on the mending a mending zone 70 shown in FIG. 1 has TIG welding (tungsten inert gas welding) applied thereto.

When this TIG welding is carried out, as a welding rod a welding rod made of A6N01 material similar to the base member is prepared, then the above stated TIG welding is carried out using the above stated welding rod made of A6N01 material. This TIG welding rod made of A6N01 material is manufactured by cutting the redundant member of the first extruded frame member 20 and/or the second extruded frame member 30 of the base member.

In accordance with this TIG welding, the joining bead 50 and the mending bead 100 are formed using the same material. In TIG welding, since the material of an electrode (tungsten electrode or tungsten alloy electrode) and a material of the welding rod differ each other, it can employ the welding rod having the same material to the base member.

Next, the raised portion 22 of the first extruded frame member 20 and the raised portion 32 of the second extruded frame member 30 are removed by the cutting and to a face of the raised portion side a hairline processing is carried out.

Figure 3:
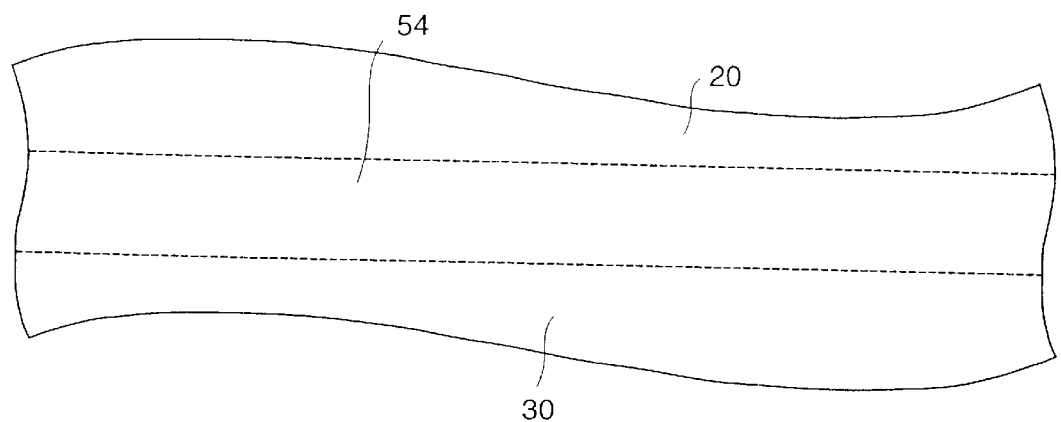
FIG. 3 is an explanatory view showing a mending process of a friction stir joining portion of one embodiment according to the present invention.
Figure 4:
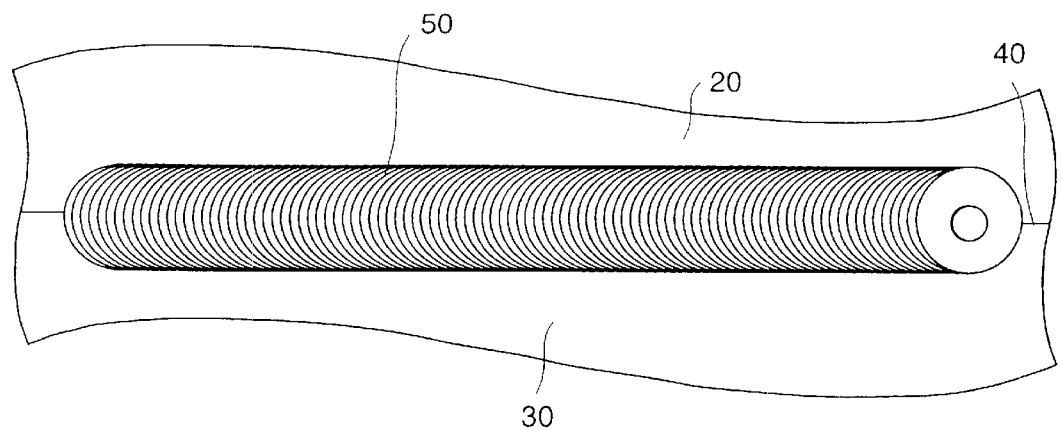
FIG. 4 is an explanatory view showing a friction stir joining.
Figure 5:
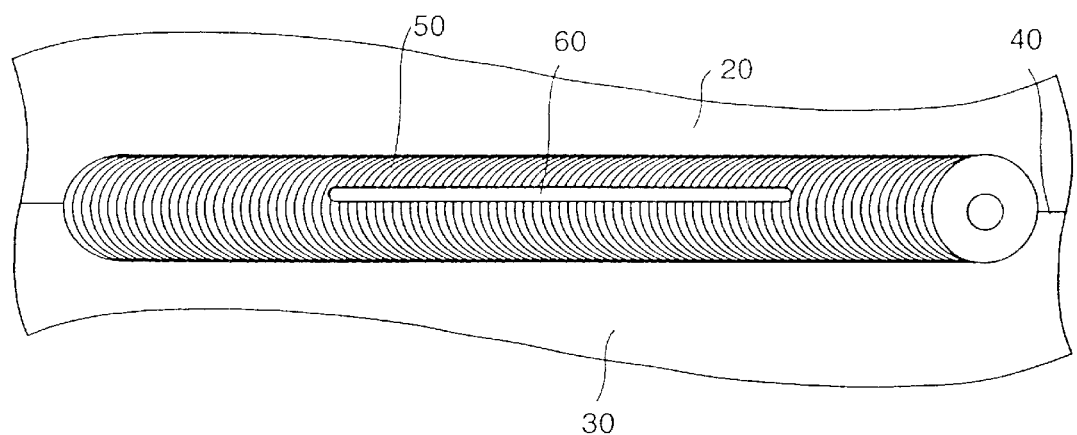
FIG. 5 is an explanatory view showing a defect of a friction stir joining.
Figure 6:
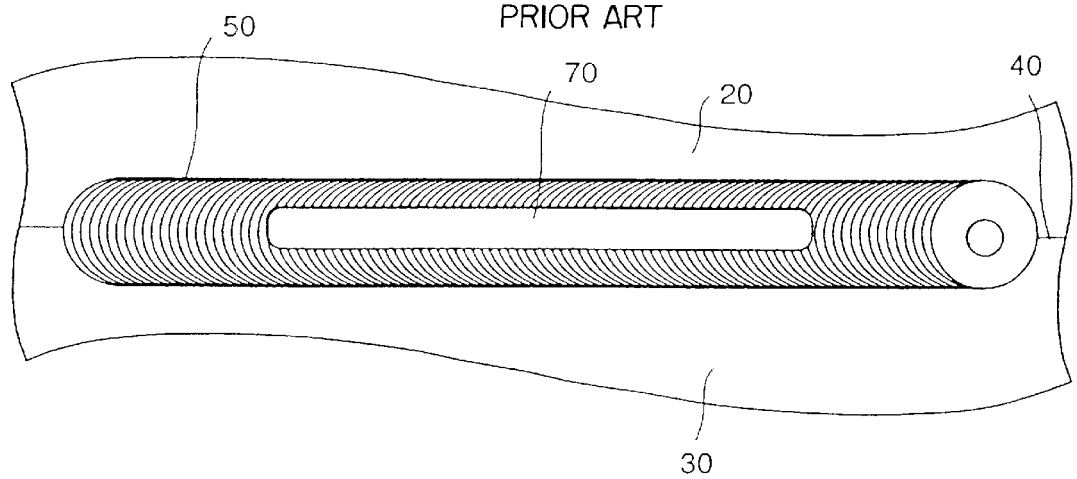
FIG. 6 is an explanatory view showing a mending process of a friction stir joining portion according to the prior art.
Figure 7:
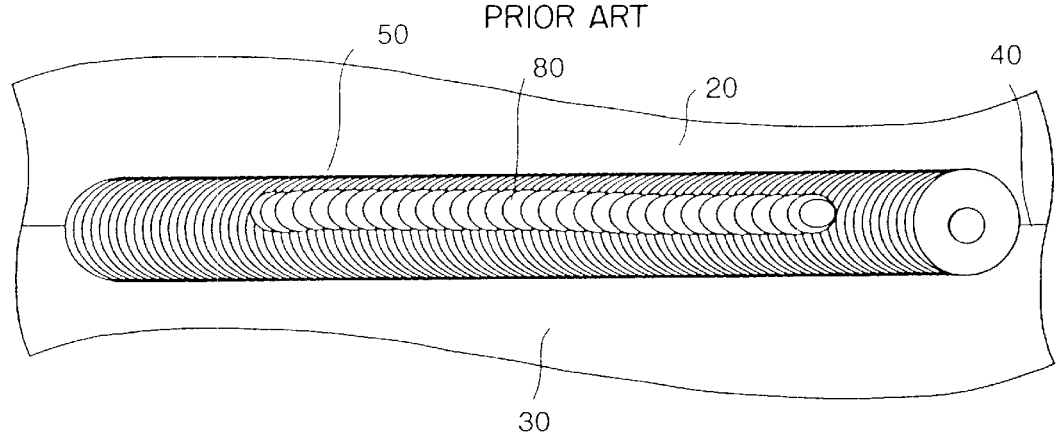
FIG. 7 is an explanatory view showing a mending process of a friction stir joining portion according to the prior art.
Figure 8:
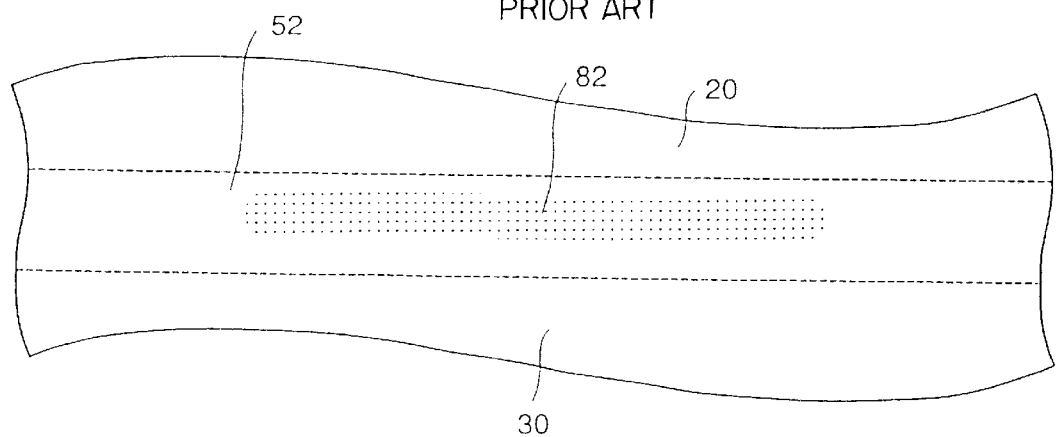
FIG. 8 is an explanatory view showing a mending process of a friction stir joining portion according to the prior art.

As a result, to a hairline processing portion 54 shown in FIG. 3 which has obtained by performing the hairline processing to the joining bead portion, the traces or the marks of the mending bead 100 are not left, accordingly the surface of the first extruded frame member 20 having a high quality and the surface of the second extruded frame member 30 having a high quality can be obtained. Accordingly, according to this embodiment of the present invention the railway car 10 having the beautiful appearance feeling can be constituted.

With the extruded frame member made of A6N01 material, when MIG welding is carried out, a welding wire made of A5356 material is used. This combination is recommended by the welding wire makers. The above stated combination is best from the aspects of the welding strength and the enforcement.

As to the combination of the frame member made of A6N01 material with the welding wire made of A6N01 material, the welding wire made of A6N01 material is not put on the market. Further, the above stated combination of the frame member made of A6N01 material with the welding wire made of A6N01 material is removed from the aspects of the welding strength and the welding performance.

Herein, from the above stated reasons, according to the present invention, the redundant member made of A6N01 material is cut off and it is made as the welding rod. Further, the inspection and the mending of the joining bead 50 is carried out after the cutting of the raised portion 22 of the first extruded frame member 20 and the raised portion 32 of the second extruded frame member 30 according to circumstances.

In the case of the first extruded frame member 20 or the second extruded frame member 30, when the joining portions are formed at both faces, the above stated TIG welding is used to the mending of the outer face in which the hairline processing is carried out. In the case of the mending of the inner face side, MIG welding is employed using the welding wire made of the material of A5356 regulation being the common material.

As shown in FIG. 10, when the friction stir joining is carried out by approaching a tip end of the small diameter portion of the rotary tool to a bed, the face at a lower face side of the first extruded frame member 20 and the second extruded frame member 30 shown in FIG. 10 is finished smoothly. This face is made to be the outer face of the railway car 10 and the hairline processing is carried out.

When the mending of the joining bead 50 is carried out from the lower face side of FIG. 10, the mending can be carried out using the above stated TIG welding. After that the performance of TIG welding, the mending bead 100 is cut off by the grinding and is made smoothly.

As stated in above, according to the present invention, when the structure member such as the aluminum made railway car is constituted by joining the extruded frame members which are made by the hollow extruded frame members forming of the aluminum alloy material, and when the defect of the joining bead according to the friction stir joining is mended, the defect portion is removed by the grinding etc. and the mending zone is formed, to this mending zone using the welding rod having the same material with the frame member, and then the mending bead is formed according to TIG welding.

Since the joining bead according to the friction stir joining and the mending bead are formed with the same material, when to the joining bead the hairline processing is performed, the traces of the mending bead are not left, a joining surface having the high beautiful feeling can be obtained.

Accordingly, without the painting processing, the railway car etc. can be constituted, the structure body having a light weight structure and suited to a recycle can be obtained.

What is claimed is:

1. A method of mending a friction stir welding portion of two members, each having an aluminum alloy as a base material and each having a raised portion in an end portion to be welded, comprising the steps of:

abutting said two members having said raised portions in said end portions to be welded;

carrying out the friction stir welding from said raised portions of said two members;

forming a mending zone by removing a defect, which is included in a welding bead, using a grinding processing;

forming a mending bead in said formed mending zone using tungsten inert gas welding with a welding rod which is made of the same material as said base material;

removing and cutting off said mending bead and said raised portions of said two members, to provide a cut-off face; and performing a hairline processing to surfaces of said two members including said cut-off face.

2. A method of mending a friction stir welding portion according to claim 1, wherein the welding rod is formed by cutting off an unnecessary portion of the frame members.

3. A method of mending a friction stir welding portion according to claim 1, wherein the aluminum alloy includes 0.4–0.9% Si, less than 0.35% Fe, less than 0.35% Cu, less than 0.50% Mn, 0.40–0.8% Mg, less than 0.3% Cr, less than 0.25% Zn, less than 0.10% Ti and remainder Al.

4. A method of mending a friction stir welding portion according to claim 1, wherein a remaining material of the two members is used as the welding rod.

5. A method of mending a friction stir welding portion according to claim 1, wherein said forming the mending bead includes applying tungsten inert gas welding to said welding rod made of the same material as the base material in said mending zone, to form the mending bead of said same material in said mending zone.

6. A method of mending a friction stir welding portion according to claim 1, wherein said mending bead in said mending zone is made of the same material as said base material.

7. A method of mending a friction stir welding portion of two frame members, each having an aluminum alloy as a base material and each having a raised portion in an end portion to be welded, comprising the steps of:

abutting said two frame members having said raised portions in said end portions to be welded;

carrying out the friction stir welding from said raised portions of said two frame members;

forming a mending zone by removing a defect, which is included in a welding bead of said two frame members, using a grinding processing;

forming a mending bead in said formed mending zone of said two frame members using tungsten inert gas welding with a welding rod which is made of the same material as said base material;

removing and cutting off said mending bead and said raised portions of said two frame members, to provide a cut-off face; and performing a hairline processing to surfaces of said two frame members including said cut-off face.

8. A method of mending a friction stir welding portion according to claim 7, wherein the welding rod is formed by cutting off an unnecessary portion of the frame members.

9. A method of mending a friction stir welding portion according to claim 7, wherein the aluminum alloy includes 0.4–0.9% Si, less than 0.35% Fe, less than 0.35% Cu, less than 0.50% Mn, 0.40–0.8% Mg, less than 0.3% Cr, less than 0.25% Zn, less than 0.10% Ti and remainder Al.

10. A method of mending a friction stir welding portion according to claim 7, wherein a remaining material of the two frame members is used as the welding rod.

11. A method of mending a friction stir welding portion according to claim 7, wherein said forming the mending bead includes applying tungsten inert gas welding to said welding rod made of the same material as the base material in said mending zone, to form the mending bead of said same material in said mending zone.

12. A method of mending a friction stir welding portion according to claim 7, wherein said mending bead in said mending zone is made of the same material as said base material.

13. A method of mending a friction stir welding portion of two extruded frame members, each having an aluminum alloy which is made substantially of A6N01 as a base material and each having a raised portion in an end portion to be welded, comprising the steps of:

abutting said two extruded frame members having said raised portions in said end portions to be welded;

carrying out the friction stir welding from said raised portions of said two extruded frame members;

forming a mending zone by removing a defect, which is included in a welding bead of said two extruded frame members;

forming a mending bead in said formed mending zone of said two extruded frame members using tungsten inert gas welding with a welding rod which is made of the same material as said base material;

removing and cutting off said mending bead and said raised portions of said two extruded frame members, to provide a cut-off face; and performing a hairline processing to surfaces of said two extruded frame members including said cut-off face.

14. A method of mending a friction stir welding portion according to claim 13, wherein the welding rod is formed by cutting off an unnecessary portion of the frame members.

15. A method of mending a friction stir welding portion according to claim 13, wherein a remaining material of the two extruded frame members is used as the welding rod.

16. A method of mending a friction stir welding portion according to claim 13, wherein said forming the mending bead includes applying tungsten inert gas welding to said welding rod made of the same material as the base material in said mending zone, to form the mending bead of said same material in said mending zone.

17. A method of mending a friction stir welding portion according to claim 13, wherein said mending bead in said mending zone is made of the same material as said base material.

18. A method of mending a friction stir welding portion of a railway car, said friction stir welding portion being formed by friction stir welding members having an aluminum alloy as a base member, comprising the steps of:

abutting said members having raised portions in said end portions to be welded;

carrying out the friction stir welding from said raised portions of said members;

forming a mending zone by removing a defect, which is included in a joining bead, according to a grinding processing;

forming a mending bead in said mending zone by tungsten inert gas welding using a welding rod which is made of the same material as said base member;

removing and cutting off said mending bead and said raised portions of said members; and performing a hairline processing to a joining portion which includes said mending bead, said joining portion being an outer face of a side structure body of the railway car.

19. A method of mending a friction stir welding portion according to claim 18, wherein a remaining material of the two members is used as the welding rod.

20. A method of mending a friction stir welding portion according to claim 18, wherein said forming the mending bead includes applying tungsten inert gas welding to said welding rod made of the same material as the base material in said mending zone, to form the mending bead of said same material in said mending zone.

21. A method of mending a friction stir welding portion according to claim 18, wherein said mending bead in said mending zone is made of the same material as said base material.

22. A method of mending a friction stir welding portion of a railway car, said friction stir welding portion being formed by friction stir welding two frame members, each having an aluminum alloy as a base member and each having a raised portion in an end portion to be welded, comprising the steps of:

abutting said two frame members having said raised portions in said end portions to be welded;

carrying out the friction stir welding from said raised portions of said two frame members;

forming a mending zone by removing a defect, which is included in a joining bead of said two frame members, according to a grinding processing;

forming a mending bead in said mending zone of said two frame members by tungsten inert gas welding using a welding rod which is made of the same material as said base member;

removing and cutting off said mending bead and said raised portions of said two frame members; and performing a hairline processing to a joining portion which includes said mending bead and said joining bead of said two frame members, said joining portion being an outer face of a side structure body of the railway car.

23. A method of mending a friction stir welding portion according to claim 22, wherein a remaining material of the two frame members is used as the welding rod.

24. A method of mending a friction stir welding portion according to claim 22, wherein said forming the mending bead includes applying tungsten inert gas welding to said welding rod made of the same material as the base material in said mending zone, to form the mending bead of said same material in said mending zone.

25. A method of mending a friction stir welding portion according to claim 22, wherein said mending bead in said mending zone is made of the same material as said base material.

26. A method of mending a friction stir welding portion of a railway car, said friction stir welding portion being formed by friction stir welding two extruded frame members, each having an aluminum alloy as a base member and each having a raised portion in an end portion to be welded, comprising the steps of:

abutting said two extruded frame members having said raised portions in said end portions to be welded;

carrying out the friction stir welding from said raised portions of said two extruded frame members;

forming a mending zone by removing a defect, which is included in a joining bead of said two extruded frame members, according to a grinding processing;

forming a mending bead in said mending zone of said two extruded frame members by tungsten inert gas welding using a welding rod which is made of the same material as said base member;

removing and cutting off said mending bead and said raised portions of said two extruded frame members; and performing a hairline processing to a joining portion which includes said mending bead and said joining bead of said two extruded frame members, said joining portion being an outer face of a side structure body of the railway car.

27. A method of mending a friction stir welding portion according to claim 26, wherein a remaining material of the two extruded frame members is used as the welding rod.

28. A method of mending a friction stir welding portion according to claim 26, wherein said forming the mending bead includes applying tungsten inert gas welding to said welding rod made of the same material as the base material in said mending zone, to form the mending bead of said same material in said mending zone.

29. A method of mending a friction stir welding portion according to claim 26, wherein said mending bead in said mending zone is made of the same material as said base material.

* * * * *